United States Patent Office 3,655,773
Patented Apr. 11, 1972

3,655,773
METHOD FOR MAKING THIOETHERS
Walter Reifschneider, Midland, Mich., assignor to The Dow Chemical Company, Midland, Mich.
No Drawing. Filed Mar. 2, 1970, Ser. No. 15,846
Int. Cl. C07c 149/32
U.S. Cl. 260—609 F          4 Claims

ABSTRACT OF THE DISCLOSURE

Phenolic thioethers are prepared by reacting a thiocyanophenol with an alkylating agent in the presence of a base and an alkali metal or ammonium sulfide according to the following representative equation wherein reactants and the phenolic thioether product are set forth:

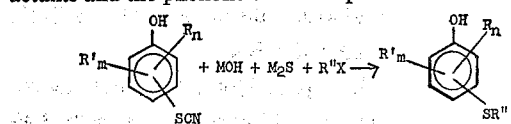

wherein R is a fluoro, chloro, bromo, iodo, lower alkyl or lower alkoxy group; R' is an R or a lower alkenyl, lower alkynyl, 3 to 6 carbon cycloalkyl, 6 to 10 carbon aryl, substituted phenyl, 7 to 8 carbon phenalkyl, phenoxy, cyano, amido, amino, lower alkylamino, lower alkylthio, hydroxy, or lower acyloxy group; $n$ is an integer from 0 to 4; $m$ is an integer from 0 to 2; the sum of $m+n$ is an integer from 0 to 4; M is alkali metal or ammonium; R" is a 1 to 12 carbon alkyl, (cyano-lower alkyl), lower alkenyl, lower alkynyl, 3 to 6 carbon cycloalkyl, or 7 to 8 carbon phenalkyl group; and X is a halide, sulfonate, sulfate or other similar anion group.

BACKGROUND OF THE INVENTION

In U.S. Pat. 3,303,209, issued Feb. 7, 1967, there is described a method for making phenolic thioethers. In the process, thiocyanophenol, its homologs and analogs are reacted with a haloaliphatic compound in the presence of a base to provide thioether substitution at the thiocyano site while leaving the phenolic hydroxyl site unreacted. In U.S. Pat. 3,406,202, issued Oct. 15, 1968, there is described a method for preparing aniline thioethers. In the method, a thiocyanoaniline compound is reacted with an alcohol, a lower alkyl sulfate, or an organic halide in the presence of a base to provide thioether substitution at the site where a thiocyano group had previously been present. As of their time in the history of the art, such procedures were satisfactory, even though the yields generally obtained thereby were only 65 percent or less, based on starting thiocyanophenol reactant.

SUMMARY OF THE INVENTION

The present invention is directed to an improved alkylation process for making phenolic thioethers from thiocyanophenols in higher yields than were previously generally obtainable, wherein an alkali metal or ammonium sulfide is added to the alkylation medium, the yields according to the improved process approximating about 80 to 90 percent or more, based on starting thiocyanophenol reactant. In the process of this invention, a thiocyanophenol reactant is contacted with an alkylating agent in the presence of a base and in the presence of an alkali metal or ammonium sulfide pursuant to the following equation wherein reactants and phenolic thioether product are set forth:

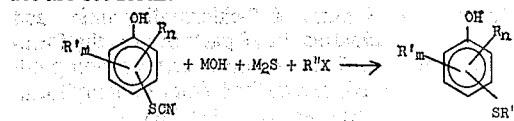

In the formulae of the equation, R is a fluoro, chloro, bromo, iodo, lower alkyl or lower alkoxy group; R' is an R or a lower alkenyl, lower alkynyl, 3 to 6 carbon cycloalkyl, 6 to 10 carbon aryl, lower alkylphenyl, halophenyl, lower alkoxyphenyl, 7 to 8 carbon phenalkyl, phenoxy, cyano, amido, amino, lower alkylamino, lower alkylthio, hydroxy or lower acyloxy group; $n$ is an integer from 0 to 4; $m$ is an integer from 0 to 2; the sum of $m+n$ is an integer from 0 to 4; M is an alkali metal or ammonium group; R" is a 1 to 12 carbon alkyl, (cyano-lower alkyl), lower alkenyl, lower alkynyl, 3 to 6 carbon cycloalkyl, or 7 to 8 carbon phenalkyl group; and X is a halide, sulfonate, sulfate or similar anion group. The terms "lower alkyl" (per se and as part of a compound word) and "lower alkoxy" (per se and as part of a compound word) refer to groups containing from 1 to 4 carbon atoms, such as methyl, ethyl, propyl, butyl, methoxy, ethoxy, propoxy and butoxy, respectively. The terms "lower alkenyl," "lower alkynyl" and "lower acyloxy" refer to groups containing from 2 to 4 carbon atoms, such as ethenyl, propenyl and butenyl; ethynyl, propynyl and butynyl; and acetoxy, propionoxy and butyroxy, respectively.

The reaction involves proportions of substantially one mole of thiocyanophenol to substantially one mole of alkylating agent in the presence of proportions of substantially 1 to 4 moles of base and substantially 0.2 to 1.2 moles of sulfide, but proportions of substantially one mole of thiocyanophenol to substantially one mole of alkylating agent in the presence of substantially 3 moles of base and substantially one mole of sulfide are preferred. The reaction is conveniently carried out in an aqueous reaction medium, advantageously an aqueous solution or dispersion of the thiocyanophenol reactant in aqueous base containing dissolved sulfide. Inert organic solvents, such as, for example, methanol, ethanol or isopropanol can be used in addition to, or in place of, water. As base there can be used an alkali metal hydroxide, an alkali metal alkoxide, an alkali metal carbonate, a strongly basic amine or a strongly basic quaternary ammonium hydroxide, i.e., any commonly used base. Conveniently, the alkylating agent is gradually added to the solution or dispersion of the thiocyanophenol in aqueous base containing dissolved alkali metal or ammonium sulfide. The reaction is carried out at a thioether-forming temperature, advantageously between 0° and 200° C. Depending on the alkylating agent, a reaction temperature between 10° and 140° C. is preferable. The reaction time ranges between about 30 minutes and about 50 hours, but usually 30 minutes to about 5 hours suffices.

Following the reaction period, phenolic thioether product is separated and recovered from the reaction mixture in conventional procedures. Advantageously, the reaction mixture is poured into a mixture of ice and excess hydrochloric or other mineral acid. From such ice and acid treatment, product phenolic thioether typically separates as a solid, as a gum, or as a liquid. Solid product is collected by filtration after the ice has melted, and is purified, if desired, by washing with water, drying and thereafter recrystallizing the residue from a suitable solvent such as methyl cyclohexane, benzene or a petroleum fraction boiling in the range of 60° to 70° C. When the product separates from the ice and acid mixture as a gum, the aqueous mixture is conveniently extracted with solvent, e.g. diethyl ether. The organic extract which forms a separate layer is then separated from the aqueous phase. The separated layer is thereafter washed with water to remove traces of acid and can also be washed with saturated sodium chloride solution. The resulting solution is then dried over anhydrous sodium sulfate and thereafter warmed to vaporize and remove the solvent by evaporation. The resulting residue can be recrystallized from a suitable recrystallization solvent, or, if more convenient, distilled, optionally under subatmospheric pressure.

DESCRIPTION OF SOME PREFERRED EMBODIMENTS

The following examples illustrate the present invention, but are not to be construed as limiting the same. Temperatures given are in centigrade degrees.

Example 1: 4-methylthio-3,5-xylenol

To a stirred solution of 48 g. (0.2 mole) of sodium sulfide nonahydrate in 240 ml. of 10% aqueous sodium hydroxide (0.66 mole) is added 35.8 g. (0.2 mole) of 4-thiocyano-3,5-xylenol. To the resulting yellow solution, 28.4 g. (0.2 mole) of methyl iodide is then added dropwise. After the addition is completed, stirring at room temperature is continued for one hour. The reaction mixture is then poured into a mixture of ice and excess hydrochloric acid to neutralize free base and to liberate the free phenolic product. An oil thereby separates and is extracted into chloroform. The chloroform solution is dried over anhydrous magnesium sulfate and the solvent is then removed by evaporation, leaving an oil which crystallizes on seeding with authentic 4-methylthio-3,5-xylenol. The product is then recrystallized from methyl cyclohexane. A quantity of 28 g. of off-white crystals, M.P. 63.5°–65.5°, is obtained. From the mother liquor, 1.7 g. of product is isolated bringing the yield to 29.7 g. (88.5%).

When 25.2 g. of dimethyl sulfate is used in place of methyl iodide, 4-methylthio-3,5-xylenol is obtained in 89% yield.

The same yield, 89%, is obtained when methyl chloride is used as alkylating agent and the reaction is carried out in a Parr autoclave at a temperature of 140°.

Example 2: p-(methylthio)phenol

A first mixture is prepared by adding 13.8 g. (0.6 mole) metallic sodium to 175 ml. methanol to obtain a solution of 0.6 mole of sodium methoxide in a substantial excess of methanol as base and solvent, respectively. To it is added 48 g. (0.2 mole) sodium sulfide nonahydrate. A second solution is prepared consisting of 30 g. (0.2 mole) p-(thiocyano)phenol and 28.4 g. (0.2 mole) methyl iodide dissolved in 150 ml. methanol. The second solution is added as a small, slow stream with continuous stirring to the first mixture to obtain a reaction mixture. Upon completion of the preparation of the reaction mixture, the resulting mixture is heated at its boiling temperature, between 60° and 70°, and under reflux for approximately 2 hours to drive the reaction to completion. Upon completion of the reaction, excess methanol is vaporized and removed, and the resulting residue poured into a mixture of ice and concentrated hydrochloric acid. Basic substances are neutralized and water-soluble neutralization products obtained, and the desired p-(methylthio)phenol product separated as an insoluble solid which is collected from the aqueous liquid by filtration. The solid residue is taken up from the filter in, and recrystallized from, a mixed solvent system of which the solvent components are benzene and a mixed aliphatic hydrocarbon fraction boiling in a 60°–70° temperature range. As a result of these procedures, there is obtained a yield of about 90 percent based on starting p-(thiocyano)-phenol of a p-(methylthio)phenol product melting at 84°–85°. The melting point for this substance in the published literature is 84°–85°.

In procedures essentially the same as the foregoing, employing 4-thiocyano-1-naphthol in place of p-(thiocyano)phenol, there is obtained 4-methylthio-1-naphthol as off-white crystals melting at 105°–107°.

Example 3: 2,6-dichloro-4-(methylthio)phenol

A first solution is prepared consisting of 50g. (0.75 mole) 85 percent pure potassium hydroxide and 22 g. (0.2 mole) potassium sulfide dissolved in 150 ml. water. A second solution is prepared consisting of 55 g. (0.25 mole) 2,6-dichloro-4-(thiocyano)phenol, and 35.5 (0.25 mole) methyl iodide dissolved in 300 ml. methanol. The first solution is added as a small, slow stream continuously and with stirring over a period of time to the said second solution to obtain a reaction mixture. Upon completion of the preparation of the reaction mixture, the resulting solution is stirred continuously at room temperature for approximately 2 hours to carry the reaction to completion and obtain the desired product. At the conclusion of 2 hours' reaction time, methanol is vaporized and removed and the resulting residue is poured into a mixture of ice and excess concentrated hydrochloric acid. From the resulting aqueous solution a solid product separates and is collected by filtration, taken up in methanol and recrystallized from a methanol-water solution to obtain 49 g. of 2,6-dichloro-4-(methylthio)phenol product. The yield represents 94 percent conversion of the starting 2,6-dichloro-4-(thiocyano)phenol. The product melts at 54°–56°. Upon analysis, the product of this example is found to have a content of carbon and hydrogen of 40.38 and 2.78 percent, respectively, as compared with theoretical values of 40.21 and 2.89 percent, respectively. The assigned structure is confirmed by infrared spectrum analysis.

Example 4: p-(cyclohexylthio)phenol

In procedures essentially the same as those of Example 2, but employing 23.7 grams (0.2 mole) chlorocyclohexane in place of methyl iodide, there is obtained a white crystalline product, p-(cyclohexylthio)phenol, melting at 63.5°.

Example 5: 2-bromo-6-chloro-4-(methylthio)phenol

A first solution is prepared consisting of 34.2 grams (0.34 mole) triethylamine and 48 g. (0.2 mole) sodium sulfide nonahydrate dissolved in 75 ml. water. A second solution is prepared consisting of 30 g. (0.113 mole) 2-bromo-6-chloro-4-(thiocyano)phenol and 16.1 grams (0.113 mole) methyl iodide dissolved in 125 ml. methanol. The first solution is added as a small, slow stream continuously and with stirring to the second solution to obtain a reaction mixture. Upon completion of the preparation of the reaction mixture, the resulting solution is stirred continuously as it is heated at its reflux temperature, about 60°–70°, for approximately 2 hours to carry the reaction to completion and obtain the desired product. At the conclusion of 2 hours' reaction time, methanol solvent is vaporized and removed and the resulting residue is poured into a mixture of ice and excess concentrated hydrochloric acid. The resulting aqueous solution is extracted with three 200 ml. portions of diethyl ether; the ether extracts are combined, washed with saturated sodium chloride solution and dried over anhydrous sodium sulfate. Ether is vaporized off and the resulting product is distilled under subatmospheric pressure. There is obtained a 2-bromo-6-chloro-4-(methylthio)phenol product as a white crystalline solid. The compound melts at 43°–44.5°. The assigned structure is confirmed by infrared spectrum analysis.

Example 6: p-(allylthio)phenol

A first solution is prepared consisting of 146.2 g. (1 mole) p-hydroxyphenyl thiocyanate and 76.5 g. (1 mole) allyl chloride dissolved in ethanol (500 ml.). A second solution is prepared consisting of 40 g. (1 mole) sodium hydroxide and 35 g. (0.5 mole) ammonium sulfide dissolved in 100 ml. water. The second solution is added as a small, slow stream continuously and with stirring over a period of time to the first solution to obtain a reaction mixture. Upon completion of the preparation of the reaction mixture, the resulting solution is stirred continuously at ambient temperature (21°–24°) for approximately one hour reaction time to carry the reaction to completion and obtain the desired product. The resulting mixture is warmed in an evaporator and solvents are vaporized and in large part removed, and the resulting residue is poured into a mixture of ice and excess concentrated hydrochloric acid. From the resulting aqueous solution, an oily product separates and is collected by ether extraction. Ether extract is warmed to vaporize and remove ether. The resulting oily product is taken up in, and recrystallized from, hot ethanol as it cools, to obtain p-(allylthio)phenol product as white crystals. The compound melts at 42°–43°.

Example 7: 4-(2-propynylthio)-3,5-xylenol

A first solution is prepared consisting of 10.2 g. (0.1 mole) triethylamine and 6.8 g. (0.1 mole) ammonium sulfide dissolved in 25 ml. ethanol. A second solution is prepared consisting of 17.5 g. (0.1 mole) 4-thiocyano-3,5-xylenol, and 11.9 g. (0.1 mole) 3-bromopropyne-2 dissolved in 200 ml. ethanol. The first solution is added as a small, slow stream continuously and with stirring over a period of time to the second solution to obtain a reaction mixture. Upon completion of the preparation of the reaction mixture, the resulting solution is stirred continuously at room temperature for approximately 3 hours to carry the reaction to completion and obtain the desired product. At the conclusion of the reaction, ethanol is vaporized off and the resulting residue is poured into a mixture of ice and excess concentrated hydrochloric acid. From the resulting aqueous solution, a solid product separates and is collected by filtration, taken up in hot ethanol and recrystallized therefrom with cooling to obtain a white, crystalline 4-(2-propynylthio)-3,5-xylenol product. The product is a crystalline solid melting at 64.5°–65.5°. The assigned structure is confirmed by infrared spectrum analysis.

Example 8

The following are additional representative preparations using other starting materials and the resulting products obtained using procedures of the present invention as described hereinbefore.

(a) From 3-fluoro-4-(thiocyano)phenol and methyl bromide gas sparged into a methanolic reaction solution, there is prepared white, crystalline 3-fluoro-4-(methylthio) phenol, molecular weight 158.2.

(b) Repeating the preceding, but using 3-chloro-4-(thiocyano)phenol in place of the 3-fluoro analog, 3-chloro-4-(methylthio)phenol, is obtained as a white crystalline solid melting at 66.5°–68°.

(c) From 2-(methylthio)-4-thiocyanophenol and methyl iodide, 2,4-bis-(methylthio)phenol, results as an oily liquid. Upon crystallization from solvent, the product obtained is a white, crystalline solid, melting at 40°–41°.

(d) From 1-bromo-2-cyanoethane and 2-methyl-4-hydroxyphenyl thiocyanate, 4-(2-cyanoethylthio)-m-cresol, melting at 85°–86° is realized.

(e) From 4-hydroxy-3-vinylphenyl thiocyanate and 1-bromobutane, there is obtained 4-(butylthio)-2-vinylphenol, molecular weight 208.3.

(f) From 2-(p-chlorophenoxy)-4-thiocyanophenol and butyl chloride, there is obtained 2-(p-chlorophenoxy)-4-(butylthio)phenol, molecular weight 328.8.

(g) From 2,3,5,6-tetrakis(methoxy)-4-hydroxyphenylthiocyanate and methyl bromide, there is obtained 2,3,5,6-tetrakis(methoxy) - 4 - (methylthio)phenol, molecular weight 260.3.

(h) From 2-benzyl-3-cyano-4-thiocyanophenol and alpha-benzyl bromide, there is obtained 2-benzyl-3-cyano-4-(benzylthio)phenol, molecular weight 331.4.

(i) From 5-hydroxy-2-thiocyanobenzamide and chlorocyclohexane, there is obtained 5-hydroxy-2-cyclohexylthiobenzamide, molecular weight 251.4.

(j) From p-(thiocyano)phenol and chlorocyclopropane, there is obtained p-(cyclopropylthio)phenol, molecular weight 166.2.

(k) From 3-ethynyl-4-thiocyanophenol and iodomethane, there is obtained 3-ethynyl-4-(methylthio)phenol, molecular weight 164.2.

(l) From p-thiocyanophenol and n-dodecyl chloride, there is obtained p-(dodecylthio)phenol, molecular weight 262.4.

The thiocyanophenol reactant of choice can readily be selected by selecting such compound wherein the thiocyano group occupies the position where it is desired to introduce the —SR″ moiety characteristic of the products of the present inventive process.

The R″X alkylation reactant of choice can readily be selected by choosing the compound wherein R″ has the identity of the thioetherifying moiety it is desired to introduce into the product compound and X is the anion group chosen for convenience.

The starting materials and procedures for making them are known. The phenolic thioethers are known to be useful for insecticidal purposes and as starting materials for preparing the corresponding carbamates.

What is claimed is:

1. Method of preparing a phenolic thioether of the formula

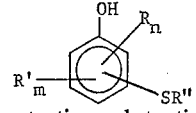

which comprises contacting substantially one molar proportion of a compound of the formula

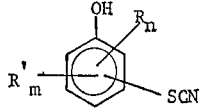

with substantially one molar proportion of a compound of the formula R″X in the presence both of substantially 1 to 4 molar proportions of a base and of substantially 0.2 to 1.2 molar proportions of an alkali metal or ammonium sulfide at a thioether-forming temperature, wherein R is a fluoro, chloro, bromo, iodo, lower alkyl or lower alkoxy group; R′ is an R or a lower alkenyl, lower alkynyl or a 3 to 6 carbon cycloalkyl; n is an integer from 0 to 3; m is an integer from 0 to 2; the sum of m+n is an integer from 0 to 4; R″ is a 1 to 12 carbon alkyl, lower alkenyl, lower alkynyl, 3 to 6 carbon cycloalkyl, or 7 to 8 carbon phenalkyl group; and X is a halide, sulfonate or sulfate.

2. Method of claim 1 wherein the contacting is carried out in an aqueous or an inert organic solvent reaction medium.

3. Method of claim 1 wherein the contacting is carried out at a temperature between about 10° and about 140° C.

4. Method of claim 1 wherein the molar proportions of reactants are substantially one of thiocyanophenol to substantially one of alkylating agent in the presence of substantially 3 of base and substantially one of sulfide.

References Cited

UNITED STATES PATENTS 3,274,257   9/1966   Reifschneider et al. __ 260—609 F

JOSEPH REBOLD, Primary Examiner

D. R. PHILLIPS, Assistant Examiner

U.S. Cl. X.R.

260—465 R, 465 F, 465 G, 488, 551 R, 571, 575